(12) United States Patent
Choi et al.

(10) Patent No.: US 8,478,244 B2
(45) Date of Patent: Jul. 2, 2013

(54) MOBILE DEVICE, AND APPARATUS AND METHOD FOR TRANSMITTING CONTENT FOR THE MOBILE DEVICE

(75) Inventors: Sang-sun Choi, Suwon-si (KR); Kyoung-hoon Yi, Seoul (KR); Young-goo Ko, Anyang-si (KR); Jeong-ja Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 679 days.

(21) Appl. No.: 11/652,488

(22) Filed: Jan. 12, 2007

(65) Prior Publication Data

US 2007/0180023 A1    Aug. 2, 2007

(30) Foreign Application Priority Data

Jan. 27, 2006    (KR) .................. 10-2006-0008691

(51) Int. Cl.
   *G06F 15/16*    (2006.01)
(52) U.S. Cl.
   USPC .................................... 455/414.1; 709/203
(58) Field of Classification Search
   USPC ............. 455/414.1–414.4; 379/157–158, 379/201.01–218.02; 370/259–271; 709/203
   See application file for complete search history.

(56) References Cited

U.S. PATENT DOCUMENTS

| | | | |
|---|---|---|---|
| 6,101,180 A * | 8/2000 | Donahue et al. | 370/352 |
| 6,605,120 B1 * | 8/2003 | Fields et al. | 715/239 |
| 6,701,350 B1 * | 3/2004 | Mitchell | 709/217 |
| 7,366,159 B1 * | 4/2008 | Parlamas et al. | 370/352 |
| 2005/0208929 A1 * | 9/2005 | Zmrzli | 455/414.2 |

FOREIGN PATENT DOCUMENTS

| | | |
|---|---|---|
| CN | 1477575 A | 2/2004 |
| JP | 2002-063109 A | 2/2002 |
| JP | 2002-312391 A | 10/2002 |
| JP | 2003-162472 A | 6/2003 |
| JP | 2005-251137 A | 9/2005 |
| KR | 10-2002-0074333 A | 9/2002 |
| KR | 10-2003-0008009 A | 1/2003 |
| KR | 10-2003-0061143 A | 7/2003 |

OTHER PUBLICATIONS

Japanese Office Communication dated Nov. 10, 2009 issued in counterpart application No. 2007-012704.
Chinese Office Action, dated Apr. 25, 2011, issued in Application No. 200710008256.7.

\* cited by examiner

*Primary Examiner* — Kashif Siddiqui
(74) *Attorney, Agent, or Firm* — Sughrue Mion, PLLC

(57) ABSTRACT

A mobile device and an apparatus and method for the mobile device, in which intercept information about contents intercepted by a user is stored in the mobile device and is transmitted together with a request for contents from the user, so that the user can use only the selected contents. The mobile device includes a content analysis unit analyzing predetermined contents and extracting selection information by which a user can determine whether to intercept the predetermined contents; an intercept information storage unit storing intercept information about intercepted contents intercepted by the user based on the extracted selection information; and a control unit transmitting the stored intercept information to a content-providing device.

27 Claims, 13 Drawing Sheets

FIG. 2 (RELATED ART)

| HOME | COOL SITE | MY PAGE |
|---|---|---|

WIRELESS INTERNET

INDEX WORD [        ]  [SEARCH]  [SEARCH CHART]

SEARCH RANGE ⦿ TOTAL ○ DIRECTORY ○ WEB

HOME > NEWS/MEDIA (23)

CATEGORY

ECONOMIC NEWSPAPER (4)   WEATHER (4)
BROADCASTING (9)   DAILIES (13)

RECOMMENDED SITES

METAWISE – COLLECTION OF NEW, IT, SPORTS,
 ECONOMIC NEWS
ELECTRONIC NEWSPAPER –INTERNET/E-BUSINESS, INFORMATION
 COMMUNICATION, COMPUTER,
 VENTURE/INVESTMENT/STOCK

GENERAL SITES

1. NEWS CLIPPING OF WinCE User (a) – SPORTS TODAY,
 PROFESSIONAL BASEBALL,
 VALLEY BALL, GOLF 2. NEWS CLIPPING OF WinCE User (b) – GOODDAY, BASEBALL,
 MAJOR LEAGUE,
 INTERNATIONAL SOCCER

FIG. 5

```
<html xmlns="http://www.w3.org/1999/xhtml" xml:lang="en" lang="en">
<HTML>
<HEAD>
<title>Yahoo! Driving Directions - San Mateo, CA to San Francisco, CA </title>
...
...
<content xmlns="http://www.w3.org/1998/content/contentML">     ⎫
    <title>Direction</title>                                   ⎬ 151
    <p xmlns='http://www.w3.org/1999/xhtml'>                   ⎭
<div id="ymapdir">
<table width="100%" border=0 cellspacing=0 cellpadding=0 align=center>
  <tr>
    <th align=left><b class="ygver">Directions</b></th>
    <th align=right>
       <small><b>
         <a href="http://us.rd.yahoo.com/maps/ddresult/tbt_on;_ylt=AkhPxyrs9OPV7jEFkDqqJKla3kcC/
         *http://maps.yahoo.com/
dd_result?newaddr=94404&taddr=&csz=SAN+Mateo%2C+CA&country=
         us&tcsz=SAN+FRANCISCO%2C+CA&tcountry=us&oerr=3003&tbt=1">Show Turn by Turn
Maps</a></b>
       </small>
    </th>
  </tr>
</table>
<table width="100%" border=0 cellspacing=0 cellpadding=0 align=center>
  <tr>
    <td>1.</td>
    <td>Starting in <b>SAN</b> <b>MATEO,</b> <b>CA</b> on <b>E</b> <b>4TH</b>
        <b>AVE</b> go toward <b>BEN</b> <b>FRANKLIN</b> <b>CT</b>  - go <b>0.8</b> mi</td>
  </tr>
  <tr>
    <td>2.</td>
    <td>Continue on <b>E</b> <b>3RD</b> <b>AVE</b>  - go <b>0.1</b> mi</td>
  </tr>
  <tr>
    <td>3.</td>
    <td>Bear <img src="http://us.i1.yimg.com/us.yimg.com/i/us/mp/gr/mp22_r.gif"
        alt=Right align=absmiddle> onto <b>US-101</b> <b>NORTH</b> toward
        <b>SAN</b><b>FRANCISCO</b>  - go <b>17.9</b> mi</td>
  </tr>
  <tr>
    <td>4.</td>
    <td>Take the <b>MISSION</b> <b>ST</b> exit  - go <b>0.4</b> mi</td>
  </tr>
  <tr>
    <td>5.</td>
    <td>Turn <img src="http://us.i1.yimg.com/us.yimg.com/i/us/mp/gr/mp22_r.gif" alt=Right
align=absmiddle> on <b>11TH</b> <b>ST</b>  - go <b>< 0.1</b> mi</td>
  </tr>
  <tr>
    <td>6.</td>
    <td>Arrive at the center of <b>SAN</b> <b>FRANCISCO,</b> <b>CA</b> </td>
  </tr>
</table>
</div>
  </p>     ⎫
</content>  ⎬ 152
```

FIG. 9 request-header ::
 'Blocking-Request: {CB-1.0 {class ' *blockitem*'}}'
class :: 'XHTML(HTML4.0)' | 'XHTML' | 'HTML3.0' | 'HTML2.0' | 'HTML1.0'
blockitem :: '{' *token-or-quoted-string+* '}'
token-or-quoted-string :: *token* | *quotedname*
token :: *alphanumpm+*

FIG. 10

GET /foo.html HTTP/1.1
Blocking-Request: {CB-1.0 {XHTML(HTML4.0) 'direction¦detailmap' }}

FIG. 13 protocol-header :: 'Protocol: {CB-1.0 {class result}}'
class:: 'XHTML(HTML4.0)' | 'HTML3.0' | 'HTML2.0' | 'HTML1.0'
result:: 'OK' | 'FAIL'

FIG. 14

HTTP/1.0 200 OK
Date: Thu, 30 Jun 1995 17:51:47 GMT
Last-modified: Thursday, 29-Jun-95 17:51:47 GMT
Protocol: {CB-1.1 { 'XHTML(HTML4.0)'  'OK' }}
Content-type: text/html
...contents of foo.html...

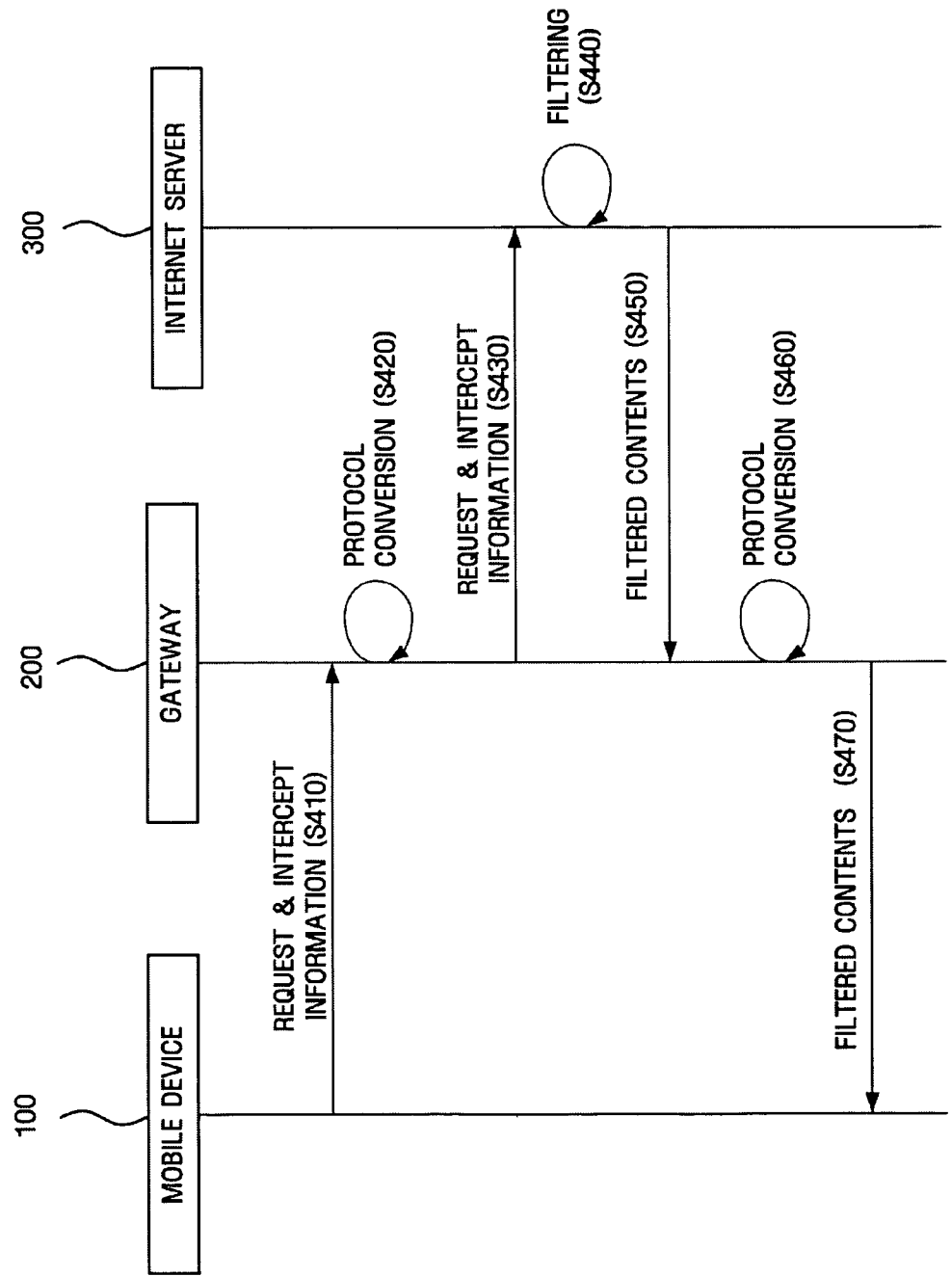

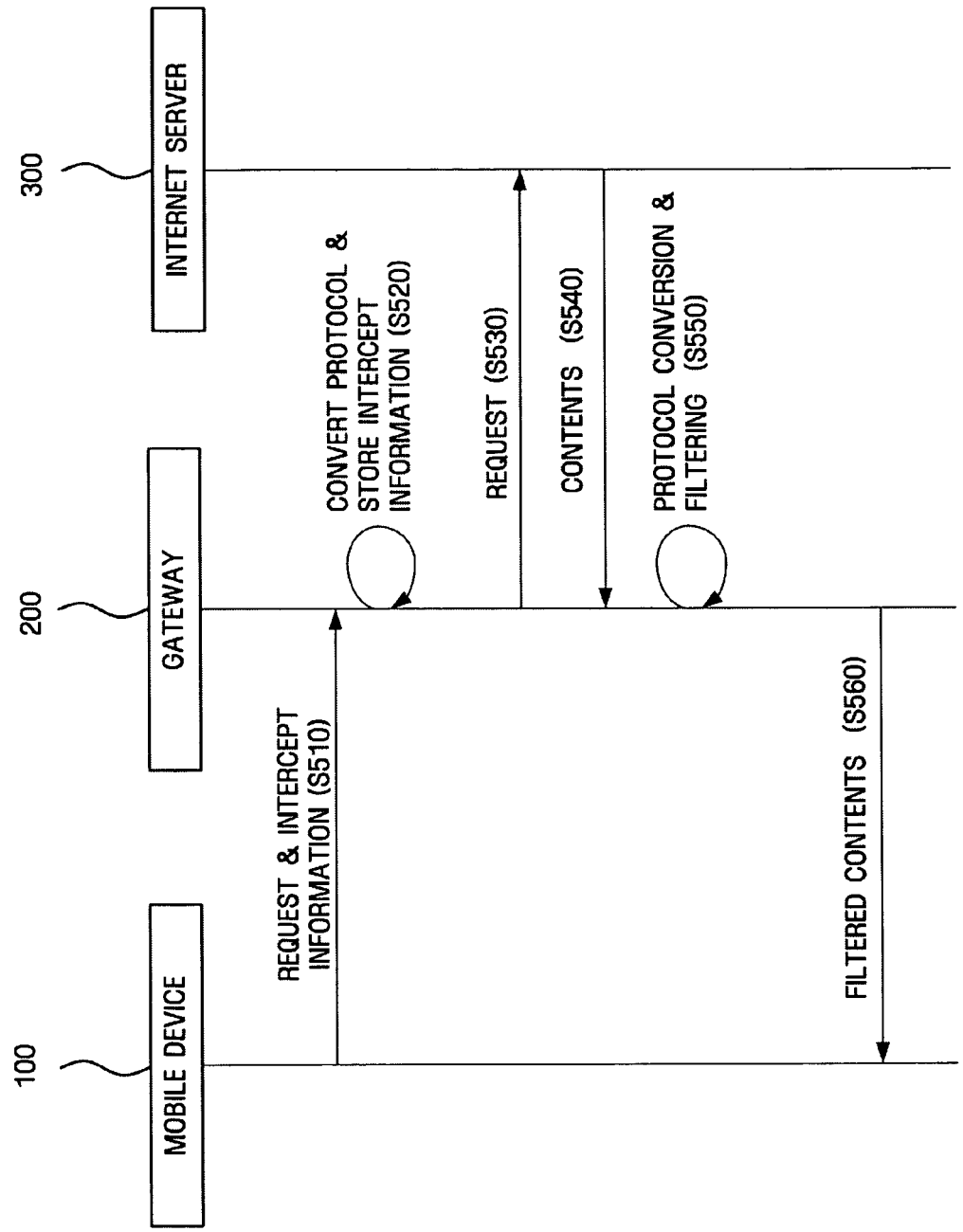

MOBILE DEVICE, AND APPARATUS AND METHOD FOR TRANSMITTING CONTENT FOR THE MOBILE DEVICE

CROSS-REFERENCE TO RELATED APPLICATION

This application claims priority from Korean Patent Application No. 10-2006-0008691 filed on Jan. 27, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to a mobile device and an apparatus and method for transmitting contents to the mobile device, and more particularly, to a mobile device and an apparatus and method for transmitting contents to the mobile device, in which requested contents are filtered in advance to allow transmission of only the selected contents, thereby reducing the quantity of data transmitted and the access fee for the contents.

2. Description of the Prior Art

Recently, the widespread use of mobile devices capable of accessing the wireless Internet, such as mobile phones, Personal Digital Assistant (PDA), etc., a user can visit any Internet sites and easily access information regardless of time and space. Further, the use of wireless Internet for mobile devices is also increasing, as wireless Internet interfaced with the conventional Internet Protocol (IP) network as an access means allows a simple access through mobile communication networks using schemes such as CDMA, GSM, GPRS, CDPD, TDMA, and W-CDMA, etc.

FIG. 1 is a block diagram of a conventional wireless Internet system.

As shown, a typical wireless Internet system 10 includes mobile devices 11a, 11b, and 11c, a gateway 12, and servers 13a, 13b, and 13c. The mobile devices 11a, 11b, and 11c equipped with a predetermined browser connect through a wireless relay network 14 (which includes a Base Transceiver System (BTS) and a Base Station Controller (BSC), etc.) to the gateway 12 provided by a wireless service provider.

The gateway 12 is connected through an IP network 15 to the servers 13a, 13b, and 13c and performs protocol conversion, etc., in order to enable the mobile devices 11a, 11b, and 11c to access the servers 13a, 13b, and 13c which provide the contents.

Further, the servers 13a, 13b, and 13c provide the contents requested by the mobile devices 11a, 11b, and 11c, and the gateway 12 converts or provides the contents provided by the servers 13a, 13b, and 13c to the mobile devices 11a, 11b, and 11c through the protocol conversion, etc.

The main protocols used between the mobile devices 11a, 11b, and 111c and the gateway 12 include Wireless Application Protocol 1.0 (WAP1.0), WAP2.0, and Mobile Explore (ME). Further, Markup languages supporting the contents may be different according to each protocol, and the gateway 12 may be equipped with a separate conversion module in order to convert a Markup language that is not supported by a predetermined protocol.

The main markup languages used for current mobile contents include Handheld Device Markup Language (HDML), J-Sky Hyper-Text Markup Language (JHTML), Voice eXtensible Markup Language (VoiceXML), Wireless Markup Language (WML), extensible Hyper-Text Markup Language (XHTML), compact Hyper-Text Markup Language (cHTML), and inline Hyper-Text Markup Language (iHTML). HDML is a specific language of an Openware using an Openware browser and uses a Handheld Device Transport Protocol (HDTP) of an Openware. JHTML is a specific language of Vodafone for a Japanese J-Sky device. VoiceXML is a standard for making an audio dialogue in a dialogue-type voice response application program. WML is based on the extensible Markup Language (XML) and is a part of the WAP. XHTML is another formal name of HTML4.0 by which anybody can add a new element and can define a new property in order to expand its function. cHTML is a simplified version of HTML for mobile devices. iHTML is a Markup language provided in the Japanese i-mode service of NTT DOCoMo, and is similar to cHTML but provides specific expansion.

Further, the gateway 12 receives a WAP from the mobile device 11a, 11b, or 11c, converts the WAP to a Hyper-Text Transfer Protocol (HTTP), and then transmits the HTTP to the server 13a, 13b, or 13c. The gateway 12 processes session information and the contents transmitted from the server 13a, 13b, or 13c to become proper for the mobile devices and provides the processed information to the mobile devices.

FIG. 2 illustrates a screen displayed when a user connects to an Internet site through a typical mobile device.

As shown, each Internet site for mobile devices produces and provides separate contents in consideration of the characteristics of the display unit of the mobile device and employs an access scheme according to category in order to facilitate access of the user to the contents. The WAP2.0 standard on which attention has been recently concentrated basically supports XHTML. Therefore, the mobile device using the WAP2.0 standard can provide various services that are provided by typical Internet sites.

When the user accesses an Internet service through a mobile device 11a, 11b, or 11c in this way, the access fee for the user of the Internet service is determined based on the number of packets transmitted between the mobile device 11a, 11b, or 11c and the gateway (or base station) 12. Therefore, the access fee may actually be too high for a user who actively uses the wireless Internet through the mobile device 11a, 11b, or 11c. Also, even though various discount rate systems, such as limitless use rate system, discount system, fixed rate system, etc., have been introduced, it is not easy for ordinary users to willingly select one of such systems. Further, while users use a wireless Internet, it is usual that the content provider one-sidedly provides contents. Therefore, the user may be charged for transmission of contents that the user does not want.

For example, in the case of content which uses HTML, has a size of 31 KB, is a CSS file, and uses an HTTP/WAP2.0 protocol, the amount as shown in Table 1 below may be charged by communication companies in the Republic of Korea, although the amount may be changed according to the kind of provided content.

TABLE 1

| Communication company | Fee |
| --- | --- |
| S company | 6.5/0.5 KB * 31 Kb = 403 |
| K company | 6.5/0.5 KB * 31 Kb = 403 |
| L company | 6.5/0.5 KB * 31 Kb = 403 |

Table 1 shows an example of the access fees for contents provided by a news site. Even when the user is interested in only news of one particular field, such as sports news or IT-related news, unnecessary contents may be transmitted to the user together with the news which the user wants. Then, the user may be charged for the additional contents which the user does not want. Further, when the Internet site for mobile devices includes a plurality of images, the user may be charged an excessive amount.

As described above, transmission of contents which the user does not want may increase the access fee to the user and may cause a speed reduction in the mobile environment, which has a limited transmission quantity.

Therefore, there has been a request for a solution by which, when a user accesses the wireless Internet through the mobile devices 11a, 11b, and 11c, the user can prevents in advance transmission of contents which the user does not want, thereby reducing the access fee and controlling the provided contents.

Korean Laid-Open Patent No. 2002-007433 discloses a method for providing information to a wireless terminal, in which a server provides a menu from an information-providing system. A user can select desired contents from the menu after the menu is stored in the terminal and can request and receive the selected contents through the wireless Internet. According to the disclosed method, the user must request the desired contents by referring to the menu stored in the terminal each time. However, there has not been proposed a method in which the user intercepts the contents which the user does not want, and the contents intercepted by the user are filtered thereafter to preliminarily prevent the contents from being provided.

SUMMARY OF THE INVENTION

Accordingly, the present invention has been made to address the above-mentioned problems occurring in the prior art, and an aspect of the present invention is to provide a mobile device and an apparatus and method for transmitting contents to the mobile device, in which intercept information about contents intercepted by a user is stored in the mobile device and is transmitted together with a request for contents from the user, so that the user can use only the selected contents.

Further to the above aspect, the present invention has additional technical aspects not described above, which can be clearly understood by those skilled in the art from the following description.

In order to accomplish these aspects, there is provided a mobile device including a content analysis unit analyzing predetermined contents and extracting selection information by which a user can determine whether to intercept the predetermined contents; an intercept information storage unit storing intercept information about intercepted contents intercepted by the user based on the extracted selection information; and a control unit transmitting the stored intercept information to a content-providing device.

In another aspect of the present invention, there is provided a mobile device including an intercept information storage unit storing intercept information about intercepted contents intercepted by a user; and a control unit transmitting the stored intercept information to a content-relay device connected to a content-providing device.

In another aspect of the present invention, there is provided an apparatus for transmitting contents for a mobile device, the apparatus including a receiver receiving intercept information about intercepted contents intercepted by a user from the mobile device; an intercept information storage unit storing the received intercept information; and a control unit determining if a content-providing device has filtered provided contents based on the intercept information, and selectively filtering the provided contents from the content-providing device based on the stored intercept information according to a result of the determination.

In another aspect of the present invention, there is provided an apparatus for transmitting contents for a mobile device, the apparatus including a receiver receiving intercept information about intercepted contents intercepted by a user from the mobile device; a filtering unit filtering provided contents based on the received intercept information; and a transmitter transmitting the filtered contents to the mobile device.

In another aspect of the present invention, there is provided a method of transmitting contents for a mobile device, the method including analyzing predetermined contents and extracting selection information by which a user can determine whether to intercept the predetermined contents; storing intercept information about intercepted contents intercepted by the user based on the extracted selection information; and transmitting the stored intercept information to a content-providing device.

In another aspect of the present invention, there is provided a method of transmitting contents for a mobile device, the method including storing intercept information about intercepted contents intercepted by a user; and transmitting the stored intercept information to a content-relay device connected to a content-providing device.

In another aspect of the present invention, there is provided a method of transmitting contents for a mobile device, the method including receiving intercept information about intercepted contents intercepted by a user from the mobile device; storing the received intercept information; and determining if a content-providing device has filtered provided contents based on the intercept information, and selectively filtering the provided contents from the content-providing device based on the stored intercept information according to a result of the determination.

In another aspect of the present invention, there is provided a method of transmitting contents for a mobile device, the method including receiving intercept information about intercepted contents intercepted by a user from the mobile device; filtering provided contents based on the received intercept information; and transmitting the filtered contents to the mobile device.

Particulars of the exemplary embodiments are incorporated in the following description and attached drawings.

BRIEF DESCRIPTION OF THE DRAWINGS

The above and other aspects, features and advantages of the present invention will be more apparent from the following detailed description taken in conjunction with the accompanying drawings, in which:

FIG. 2 illustrates a screen displayed when a user connects to an Internet site through a typical mobile device;

FIG. 5 illustrates an XHTML source code of the content shown in FIG. 4;

FIG. 9 illustrates a construction of a protocol necessary for transmission of the intercept information from a mobile device according to an exemplary embodiment of the present invention;

FIG. 10 illustrates intercept information transmitted from a mobile device according to an exemplary embodiment of the present invention;

FIG. 13 illustrates a construction of a protocol of a response message to intercept information from an Internet server according to an exemplary embodiment of the present invention;

FIG. 14 illustrates a response message transmitted from an Internet server according to an exemplary embodiment of the present invention;

FIG. 15 is a signal flowchart of a process for filtering contents by an Internet server according to an exemplary embodiment of the present invention; and FIG. 16 is a signal flowchart of a process for filtering contents by a gateway according to an exemplary embodiment of the present invention.

DETAILED DESCRIPTION OF THE EXEMPLARY EMBODIMENTS

Figure 1:
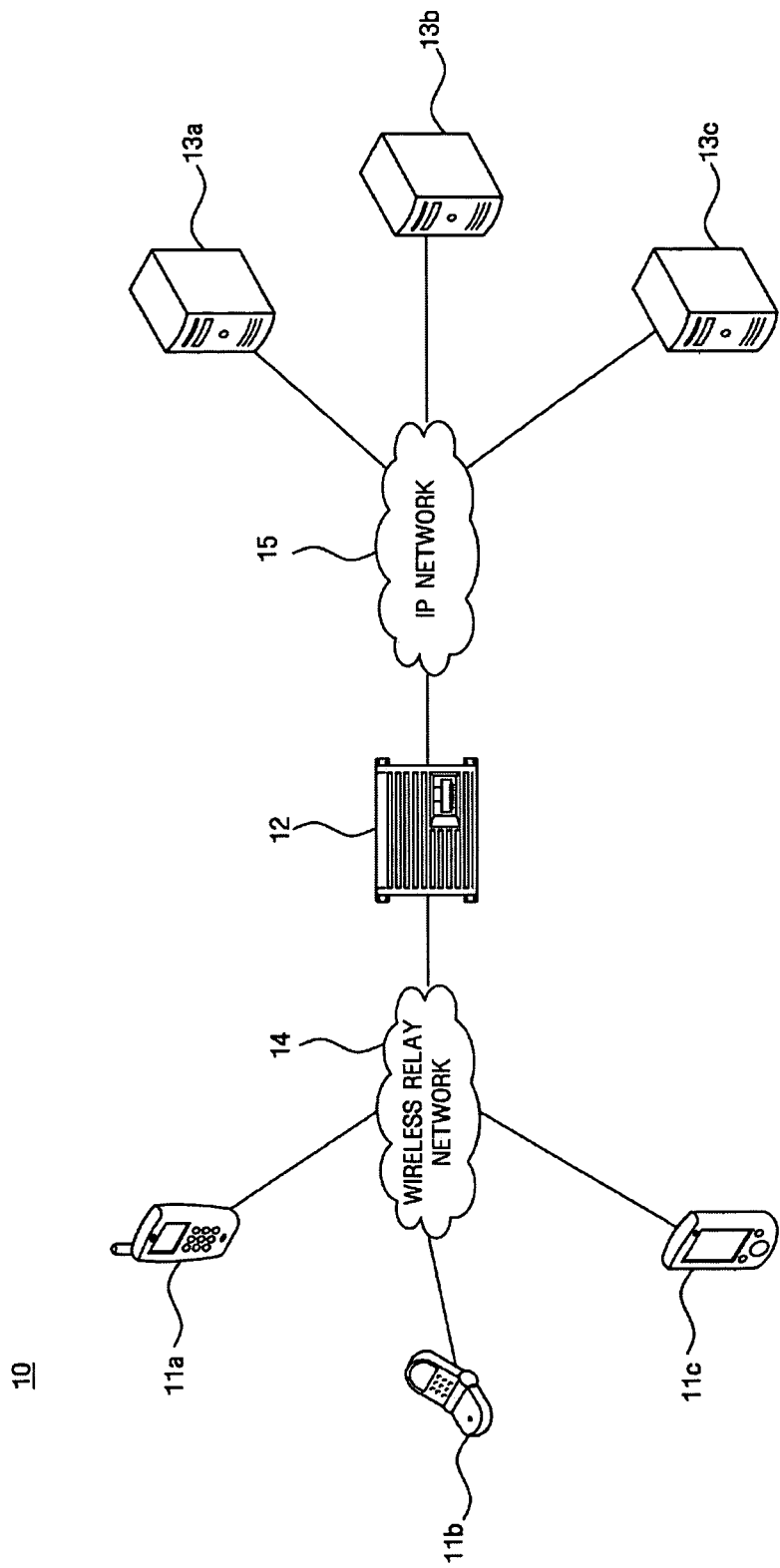
FIG. 1 is a block diagram of a typical wireless Internet system.

Advantages and features of the present invention, and ways to achieve them will be apparent from exemplary embodiments of the present invention as will be described below together with the accompanying drawings. However, the scope of the present invention is not limited to such exemplary embodiments and the present invention may be realized in various forms. The exemplary embodiments to be described below are nothing but the ones provided to bring the disclosure of the present invention to perfection and assist those skilled in the art to completely understand the present invention. The present invention is defined only by the scope of the appended claims. Also, the same reference numerals are used to designate the same elements throughout the specification.

The present invention is described hereinafter with reference to block diagrams or flowcharts for illustrating mobile devices, and apparatuses and methods for the mobile devices according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 3:
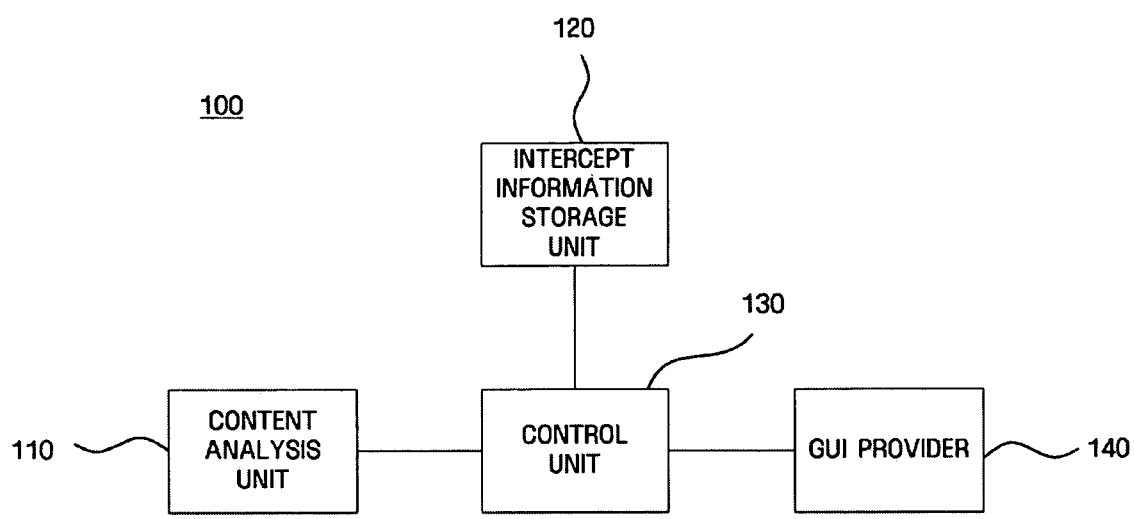
FIG. 3 is a block diagram of a mobile device according to an exemplary embodiment of the present invention.

FIG. 3 is a block diagram of a mobile device according to an exemplary embodiment of the present invention.

As shown, the mobile device 100 according to an exemplary embodiment of the present invention includes a content analysis unit 110 for analyzing predetermined contents and extracting selection information by which a user can determine whether to intercept the predetermined content, an intercept information storage unit 120 for storing intercept information about intercepted contents which are intercepted by the user based on the extracted selection information, a control unit 130 for transmitting the stored intercept information to a content-providing device, and a Graphic User Interface (GUI) provider 140 for providing contents and selection information included in the contents to the user through a predetermined graphic user interface.

In the exemplary embodiments of the present invention as described below, the contents and the selection information included in the contents are made in a Markup language, such as HDML, JHTML, VoiceXML, WML, XHTML, cHTML, and iHTML.

The content analysis unit 110 analyzes contents provided by the content-providing device and extracts selection information based on a result of the analysis. A user can determine whether to intercept the content based on the selection information. Then, the content and the selection information are displayed on a graphic user interface provided by the graphic user interface provider 140. Therefore, the user can recognize the content and the selection information from the graphic user interface.

Figure 4:
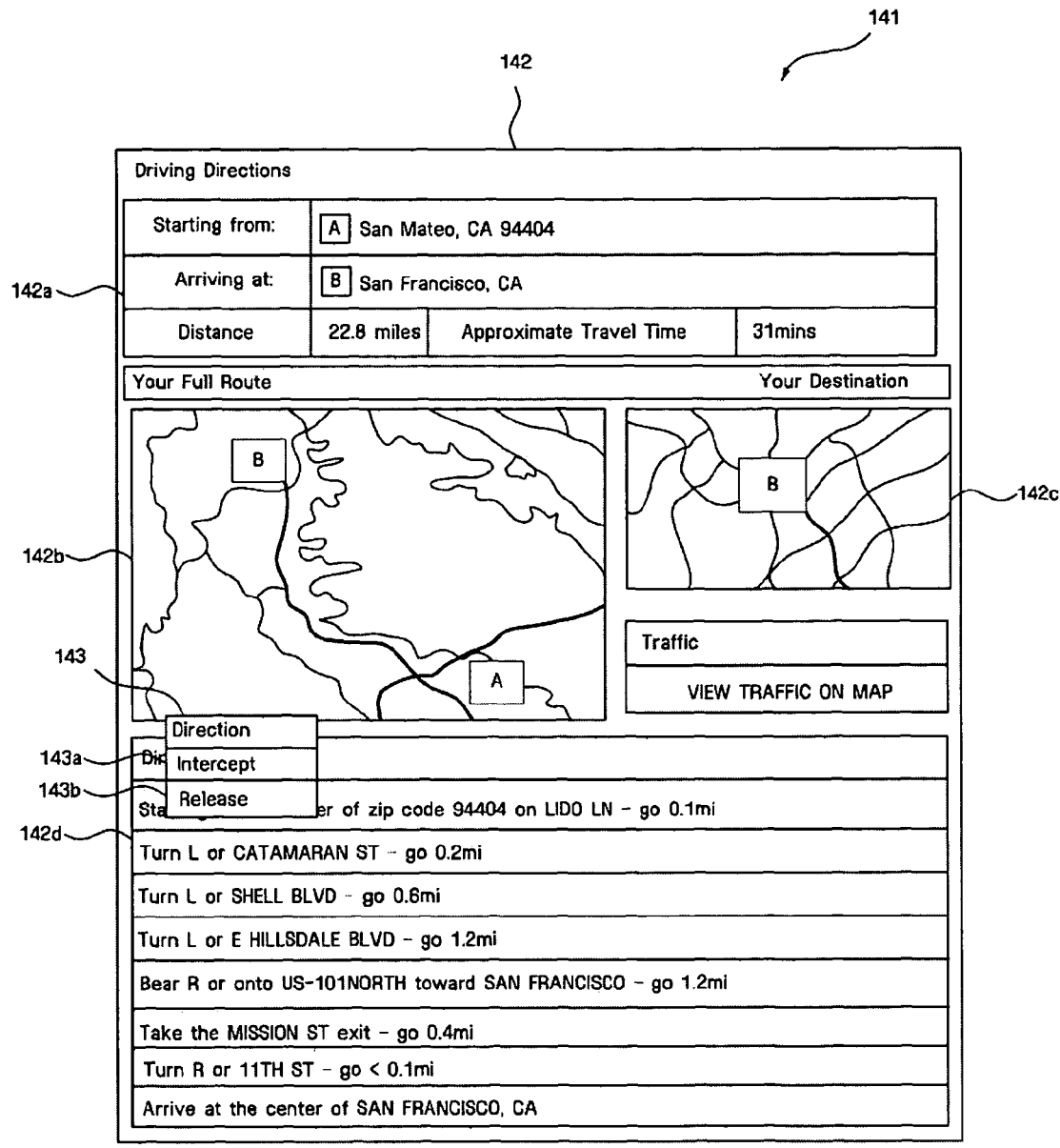
FIG. 4 illustrates a graphic user interface according to an exemplary embodiment of the present invention.

FIG. 4 illustrates a graphic user interface according to an exemplary embodiment of the present invention. Although the content displayed on the graphic user interface of FIG. 4 corresponds to navigation information provided to the mobile device 100 by the content-providing device, the present invention is not limited to the displayed content.

As shown, a graphic user interface 141 according to an exemplary embodiment of the present invention has content 142 including navigation information with various items 142a, 142b, 142c, and 142d and a pop up selection information window 143 by which the user can determine whether to intercept a predetermined item 142d of the provided content. The selection information window 143 includes items of an intercept 143a and a release 143b by which the user can determine whether to intercept a predetermined item of predetermined content. Therefore, when the same content is transmitted again to the user at a later time, the item intercepted by the user is not transmitted to the user. For example, if the user has intercepted the Direction item 142*d* in FIG. 4, the Direction item 142*d* intercepted by the user is filtered and is not transmitted to the user when the same content as that in FIG. 4 is transmitted later to the user.

Although FIG. 4 shows an example in which only one item in the content is intercepted, it is also possible to intercept the entire content itself. Therefore, in the following description of the exemplary embodiments of the present invention, intercepting of content refers to intercepting of either the entire content or at least one item within the content.

FIG. 5 illustrates an XHTML source code of the content shown in FIG. 4.

It is noted that the source code includes tags 151, 152 corresponding to the selection information window 143 by which the user can determine whether to intercept the Direction item 142*d* of FIG. 4. Therefore, the user can intercept content which the user does not want, in order to selectively receive only the content which the user wants.

The intercept information storage unit 120 stores intercept information about the intercepted content that is intercepted by the user based on the selection information and the content displayed by the graphic user interface provider 140.

The intercept information storage unit 120 may include memory devices, such as cache, ROM, PROM, EPROM, EEPROM, flash memory, SPRAM, and DRAM, although the present invention is not limited to the enumerated memories.

When the user requests predetermined content, the control unit 130 transmits the content and the intercept information stored in the intercept information storage unit 120 to the content-providing device (for example, servers 13*a*, 13*b*, 13*c*, of FIG. 1). As a result, before providing the content requested by the user, the content-providing device can filter the content based on the intercept information and eliminate the item intercepted by the user.

Therefore, the user can receive only the content that the user wants. As a result, the user need not pay the additional access fee for unnecessary content and can prevent in advance speed reduction due to the unnecessary content in a mobile environment with a limited transmission quantity.

In the above description with reference to FIG. 3, the content-providing device inserts the selection information in advance into the provided content, so that the user can use the selection information in order to determine whether to intercept predetermined content. However, when the content-providing device does not support the selection information, the mobile device 100 does not transmit the intercept information to the content-providing device. Instead, the mobile device 100 transmits the intercept information to a gateway connected to the content-providing device, which enables the mobile device 100 to request contents to the content-providing device through a wireless relay network. Then, the intercept information transmitted from the mobile device 100 is stored in the gateway, and the gateway filters the content requested by the user based on the intercept information when the content provided by the content-providing device passes through the gateway.

Therefore, it is possible to filter out the content intercepted by the user either when the content provided by the content-providing device includes the selection information or when the content provided by the content-providing device does not include the selection information. Therefore, the user can receive only the content that the user wants. As a result, the user need not pay the additional access fee for unnecessary content and can prevent in advance speed reduction due to the unnecessary content in a mobile environment with a limited transmission quantity.

When the content intercepted by the user is filtered out by the gateway instead of the content-providing device as described above, the content analysis unit 110 for analyzing the content and extracting selection information may be omitted from the mobile device 100 of FIG. 3, and the user can store the intercept information in the intercept information storage unit 120 by himself/herself. In this case also, the user can select the content to be intercepted through the graphic user interface provided by the graphic user interface provider 140, as in the exemplary embodiment of FIG. 3. Then, the control unit 130 transmits the intercept information about the content intercepted by the user to the gateway connected to the content-providing device, instead of transmitting it to the content-providing device. Then, the gateway filters the content provided by the content-providing device based on the received intercept information and then transmits the filtered content to the mobile device 100.

Figure 6:
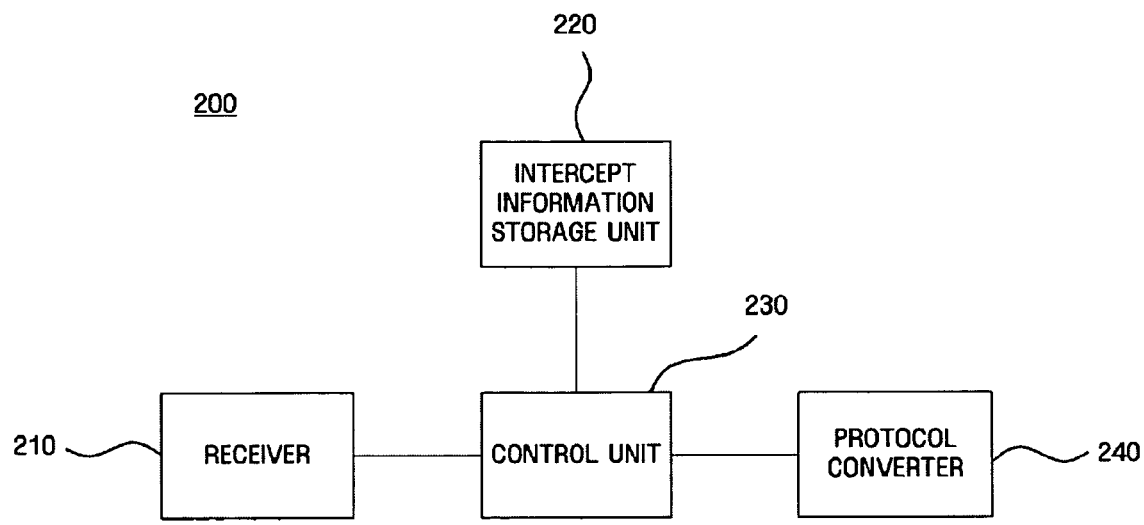
FIG. 6 is a block diagram of an apparatus for transmitting contents for a mobile device according to an exemplary embodiment of the present invention.

FIG. 6 is a block diagram of an apparatus for transmitting contents for a mobile device according to an exemplary embodiment of the present invention. The apparatus for transmitting contents for a mobile device as shown in FIG. 6 may be understood as a gateway which is connected to the content-providing device so that the mobile device 100 can request contents from the content-providing device through a wireless relay network. Hereinafter, the apparatus for transmitting contents for a mobile device as shown in FIG. 6 will be referred to as a "gateway."

As shown, the gateway 200 according to an exemplary embodiment of the present invention includes a receiver 210 for receiving intercept information from the mobile device 100, an intercept information storage unit 220 for storing the received intercept information, a control unit 230 for transmitting the stored intercept information to a content-providing device, and a protocol converter 240 for converting a protocol between the mobile device 100 and the content-providing device.

When the user has requested predetermined content through the mobile device 100, the receiver 210 receives the request together with the intercept information of the intercepted content intercepted by the user.

The intercept information storage unit 220 stores the received intercept information, and the control unit 130 selectively transmits the stored intercept information to the content-providing device depending on whether the contents provided by the content-providing device includes the selection information.

In other words, when the contents provided by the content-providing device include the selection information, the control unit 230 transmits the stored intercept information to the content-providing device because the content-providing device filters the provided contents based on the intercept information. In contrast, when the contents provided by the content-providing device do not include the selection information, the control unit 230 does not transmit the stored intercept information to the content-providing device because the control unit 230 itself performs the filtering through comparison between the contents transmitted from the content-providing device and the intercept information stored in the intercept information storage unit 220.

Specifically, when the contents provided by the content-providing device include the selection information, the control unit 230 transmits the stored intercept information and the request for the contents to the content-providing device, receives filtered contents transmitted from the content-providing device, and then transmits the received filtered contents to the mobile device 100.

In contrast, when the contents provided by the content-providing device do not include the selection information, the control unit 230 does not transmit the intercept information to the content-providing device. Instead, the control unit 230 filters the provided contents based on the intercept information and then transmits the filtered contents to the mobile device 100.

According to the present exemplary embodiment described above, the control unit 230 selectively transmits the intercept information to the content-providing device. However, this is only an example in order to aid understanding of the present invention, and the control unit 230 may perform the filtering by using the intercept information stored in the intercept information storage unit 220 when the provided contents do not include the selection information or the provided contents include a predetermined field having a failure value.

The protocol converter 240 converts a protocol between the mobile device and the content-providing device. For example, the mobile device 100 mainly uses a WAP and the content-providing device uses an HTTP; the protocol converter 240 performs protocol conversion between them.

Figure 7:
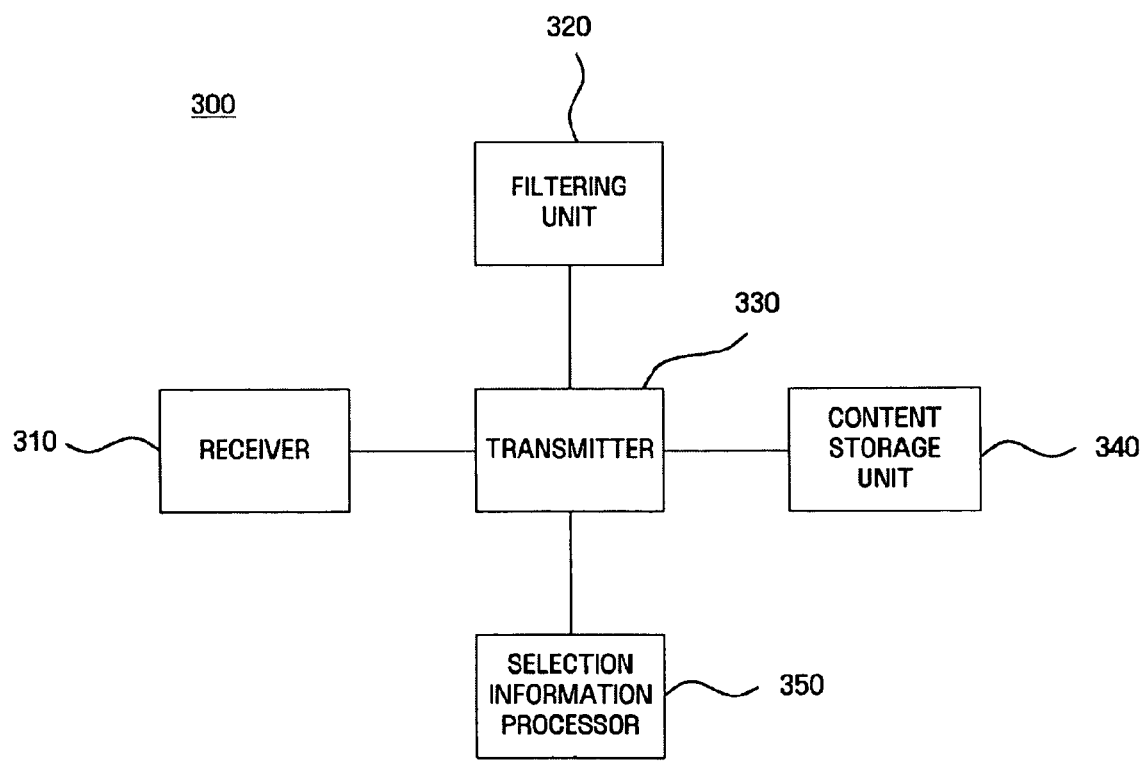
FIG. 7 is a block diagram of another apparatus for transmitting contents for a mobile device according to an exemplary embodiment of the present invention.

FIG. 7 is a block diagram of another apparatus for transmitting contents for a mobile device according to an exemplary embodiment of the present invention. The apparatus for transmitting contents for a mobile device as shown in FIG. 7 may be understood as an Internet server which provides contents in response to the request from the mobile device 100. Hereinafter, the apparatus for transmitting contents for a mobile device as shown in FIG. 7 will be referred to as an "Internet server."

As shown, the Internet server 300 according to an exemplary embodiment of the present invention includes a receiver 310 for receiving the request for predetermined contents from the user and the intercept information about the contents intercepted by the user, a filtering unit 320 for filtering the provided contents based on the received intercept information, a transmitter 330 for transmitting the filtered contents to the mobile device 100, a content storage unit 340 for storing contents which can be provided, and a selection information processor 350 for inserting the selection information for a user's intercept determination into the contents transmitted to the mobile device 100.

According to the exemplary embodiment shown in FIG. 7, the Internet server 300 receives the intercept information from the mobile device 100 and uses the intercept information to filter the contents to be provided. This corresponds to a case in which the contents provided by the Internet server 300 include the selection information. However, when the contents provided by the Internet server 300 do not include the selection information, the Internet server 300 provides the contents requested by the user without filtering. When the Internet server 300 does not perform the filtering, the filtering unit 320 may be omitted from the elements shown in FIG. 7.

The filtering unit 320 extracts the requested contents from the content storage unit 340 and filters the contents based on the intercept information, and the transmitter 330 transmits the filtered contents to the mobile device 100. When the filtered contents are transmitted to the mobile device 100, the gateway 200 as shown in FIG. 6 may convert a protocol for the contents passing through the gateway 200.

The selection information processor 350 inserts the selection information into the contents transmitted to the mobile device 100 to be displayed in the selection information window 143 on the graphic user interface 141 as shown in FIG. 4, so that the user can determine whether to intercept predetermined contents. According to the present exemplary embodiment, the contents provided by the Internet server 300 include the selection information. However, the present invention is not limited thereto, and the selection information processor 350 may be omitted when the Internet server 300 does not support the selection information.

Figure 8:
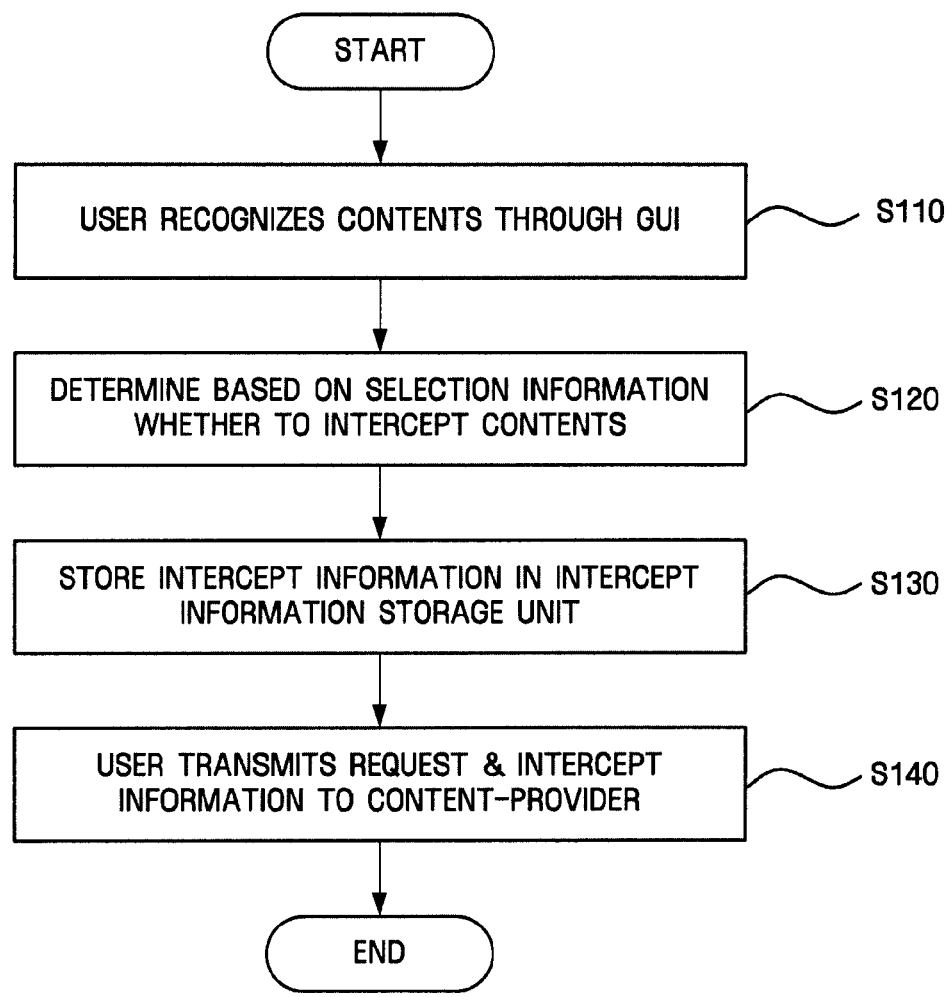
FIG. 8 is a flowchart of a method for transmitting intercept information from a mobile device according to an exemplary embodiment of the present invention.

FIG. 8 is a flowchart of a method for transmitting intercept information from a mobile device according to an exemplary embodiment of the present invention.

In a method for transmitting intercept information from a mobile device according to an exemplary embodiment of the present invention, a user first recognizes contents through a graphic user interface provided by the graphic user interface provider 140 (step S110), and then determines through the selection information displayed on the graphic user interface whether to intercept the contents (step S120). The selection information can be displayed in the form of a pop-up window or a word balloon on the graphic user interface.

When the user has determined whether to intercept the contents, the intercept information about the contents intercepted by the user is stored in the intercept information storage unit 120 (step S130).

Then, the control unit 130 transmits the request for the contents from the user and the intercept information stored in the intercept information storage unit 120 to the gateway (step S140). The transmitted intercept information may be added to a header of a transmitted WAP or a header of a transmitted HTTP.

For example, when the intercept information stored in the intercept information storage unit 120 is added to a header of a transmitted HTTP, the intercept information may be transmitted in the form as shown in FIG. 10 to the content-providing device through the construction of a protocol necessary for transmission of the intercept information by using an HTTP as shown in FIG. 9. The intercept information as shown in FIG. 10 corresponds to a case in which the Direction item 142*d* has been intercepted from the contents 141 displayed on the graphic user interface shown in FIG. 4 described above. Although the intercept information is added to a header of a transmitted HTTP, it is naturally possible to add the intercept information to a header of a transmitted WAP.

The process shown in FIG. 8 corresponds to a case in which the contents provided by the content-providing device include the selection information. When the contents provided by the content-providing device do not include the selection information, the mobile device 100 may generate and transmit the intercept information for predetermined contents selected by the user.

Figure 11:
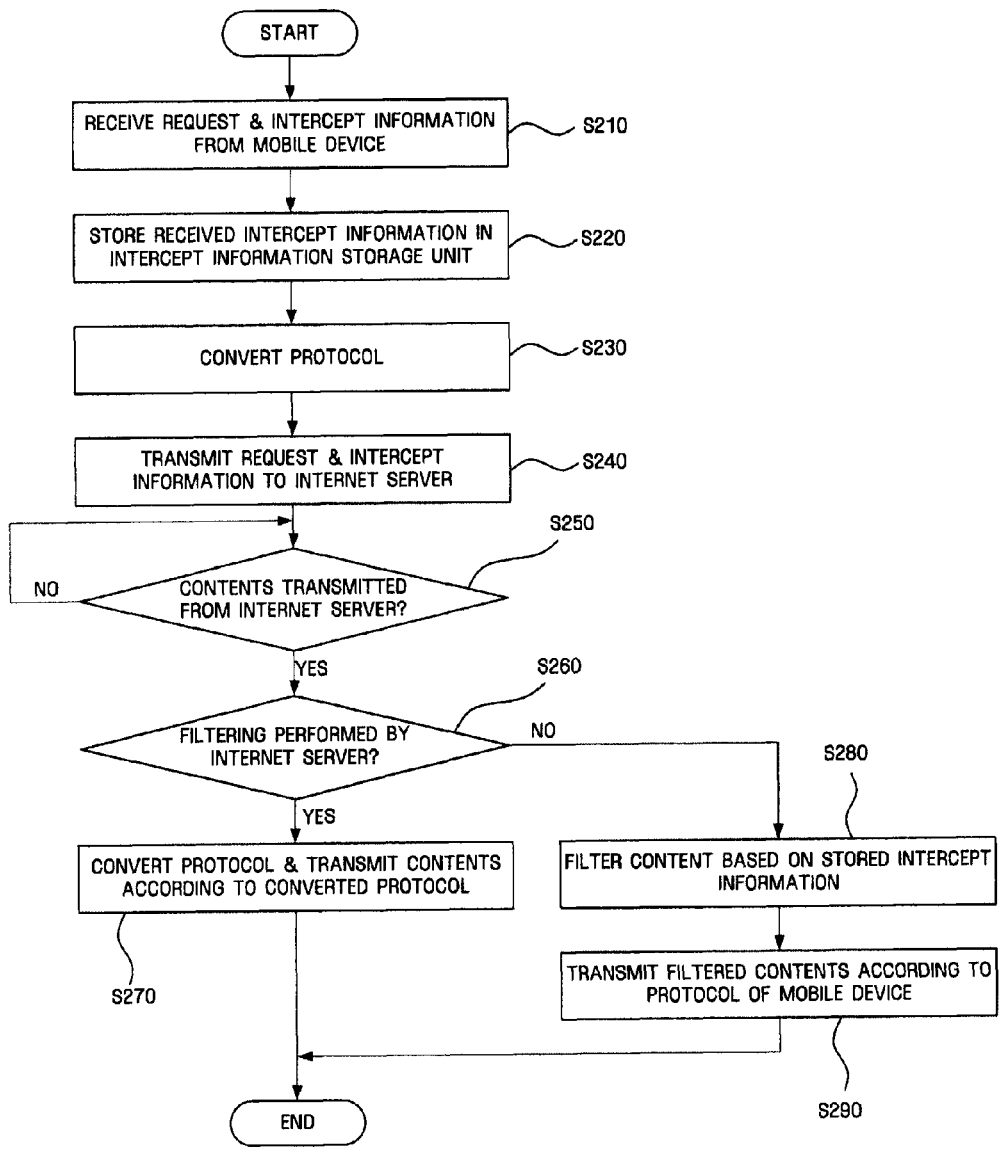
FIG. 11 is a flowchart of a method for transmitting contents by a gateway according to an exemplary embodiment of the present invention.

FIG. 11 is a flowchart of a method for transmitting contents by a gateway according to an exemplary embodiment of the present invention.

In a method for transmitting contents by a gateway according to an exemplary embodiment of the present invention, the receiver 210 first receives the request for the contents and the intercept information from the mobile device 100 (step S210).

The intercept information storage unit 220 stores the intercept information received by the receiver 210 (step S220). According to the present exemplary embodiment, the intercept information storage unit 220 stores only the intercept information. However, the present invention is not limited thereto, and the intercept information storage unit 220 may store the request for the contents together with the intercept information.

Then, the protocol converter 240 converts a protocol used by the mobile device 100 to a protocol used by the Internet server 300 (step S230), and the control unit 230 transmits the intercept information of the converted protocol to the Internet server 300 (step S240).

Thereafter, when the requested contents have been transmitted from the Internet server 300 (step S250), the control unit 230 determines if the Internet server 300 has performed the filtering of the contents based on the intercept information (step S260).

When it is determined that the Internet server 300 has performed the filtering of the contents based on the intercept information, the control unit 230 causes the protocol converter 240 to convert a protocol of the contents transmitted from the Internet server 300 into a protocol used by the mobile device 100, and then transmits the contents to the mobile device 100 according to the converted protocol (step S270).

When it is determined that the Internet server 300 has not performed the filtering of the contents based on the intercept information, the control unit 230 filters the contents transmitted from the Internet server 300 based on the intercept information stored in the intercept information storage unit 220 (step S280), causes the protocol converter 240 to convert the protocol of the filtered contents into the protocol used by the mobile device 100, and then transmits the filtered contents to the mobile device 100 according to the converted protocol (step S290).

When the filtering is performed by the gateway 200 as in step S280, that is, when the contents transmitted from the Internet server 300 do not include filtering information or intercept information or when a predetermined field has a failure value, the control unit 230 may perform the filtering based on the intercept information stored in the intercept information storage unit 220.

Figure 12:
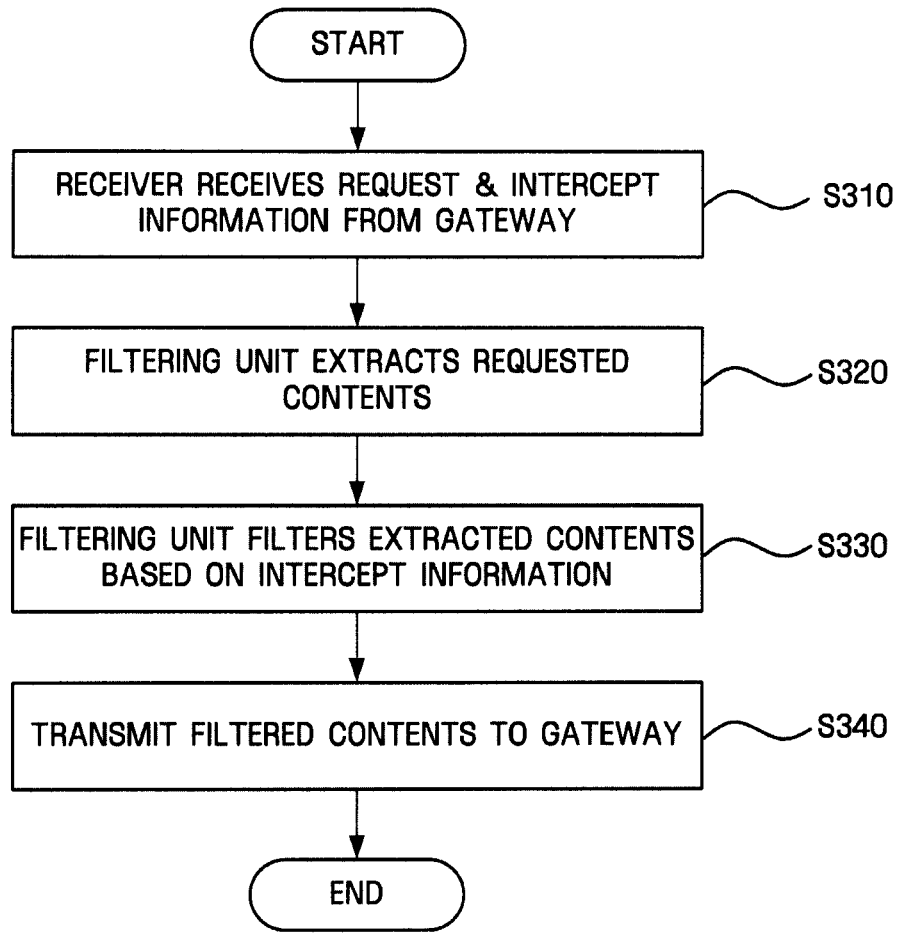
FIG. 12 is a flowchart of a method for transmitting contents by an Internet server according to an exemplary embodiment of the present invention.

FIG. 12 is a flowchart of a method for transmitting contents by an Internet server according to an exemplary embodiment of the present invention.

In a method for transmitting contents by an Internet server according to an exemplary embodiment of the present invention, the receiver 310 first receives the request for contents and the intercept information transmitted by the mobile device 100 from the gateway 200 (step S310).

Then, the filtering unit 320 extracts the requested contents from the content storage unit 340 (step S320), and filters the contents based on the intercept information (step S330).

Thereafter, the transmitter 330 transmits the filtered contents to the gateway 200 (step S340), so that the gateway 200 can transmit the contents to the mobile device 100.

The method for transmitting contents by the Internet server 300 as shown in FIG. 12 corresponds to a case in which the Internet server 300 supports the filtering of the contents. However, when the Internet server 300 does not support the filtering of the contents, the Internet server 300 may transmit the requested contents to the gateway 200 without filtering. When the Internet server 300 does not perform the filtering of the contents, the gateway 200 may perform the filtering as in the process shown in FIG. 11.

When the Internet server 300 has received the intercept information, the Internet server 300 has the protocol structure as shown in FIG. 13 if the Internet server 300 can perform the filtering of the contents. Further, when the intercept of contents has been normally performed, the result filed is set to have a value of OK as shown in FIG. 14. Otherwise, the result filed is set to have a failure value, and the intercept information may be returned.

FIG. 15 is a signal flowchart of a process for filtering contents by an Internet server according to an exemplary embodiment of the present invention.

In a process for filtering contents by an Internet server according to an exemplary embodiment of the present invention, the mobile device 100 first transmits a request for contents from a user and intercept information about contents intercepted by the user to the gateway 200 (step S410).

The gateway 200 converts the protocol (step S420) and then transmits the request and the intercept information to the Internet server 300 (step S430). The Internet server 300 filters the requested contents based on the intercept information (step S440).

Then, the Internet server 300 transmits the filtered contents to the gateway 200 (step S450), and the gateway 200 converts the protocol (step S460) and then transmits the contents from the Internet server 300 to the mobile device 100 (step S470).

FIG. 16 is a signal flowchart of a process for filtering contents by a gateway according to an exemplary embodiment of the present invention.

In a process for filtering contents by a gateway according to an exemplary embodiment of the present invention, the mobile device 100 first transmits a request for contents from a user and intercept information about contents intercepted by the user to the gateway 200 (step S510).

The gateway 200 stores the received intercept information and converts the protocol of the request (step S520) and then transmits the request to the Internet server 300 according to the converted protocol (step S530).

Then, the Internet server 300 transmits the requested contents to the gateway 200 (step S540), and the gateway 200 filters the transmitted contents based on the intercept information and converts the protocol into the protocol of the mobile device 100 (step S550).

Thereafter, the gateway 200 transmits the filtered contents to the mobile device 100 (step S560).

As used herein, the "unit" or "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

By a mobile device, and an apparatus and method for transmitting contents for the mobile device according to the exemplary embodiments of the present invention as described above, when a user accesses a wireless Internet by the mobile device, the user can receive only the contents which the user wants and can deny reception of unnecessary contents, thereby reducing the access fee for transmission of unnecessary contents and preventing speed reduction in a limited mobile environment.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A mobile device comprising:
    a content analysis unit that analyzes predetermined contents and that extracts selection information by which a user of the mobile device can determine whether to intercept the predetermined contents;
    an intercept information storage unit that stores intercept information about intercepted contents intercepted by the user of the mobile device based on the extracted selection information; and
    a control unit that transmits the stored intercept information to a content-providing device such that content corresponding to the intercept information is prevented from being transmitted by an originator of said content corresponding to the intercept information based on the intercept information.

2. The mobile device of claim 1, wherein the contents and the selection information are in a Markup language.

3. The mobile device of claim 1, further comprising a Graphic User Interface (GUI) provider that provides a predetermined graphic user interface including the contents and the extracted selection information to the user.

4. The mobile device of claim 1, wherein the control unit adds the stored intercept information into a header of a predetermined protocol and sends the protocol to the content-providing device.

5. The mobile device of claim 1, wherein the content-providing device filters the contents based on the intercept information and then transmits the filtered contents.

6. A mobile device comprising:
    an intercept information storage unit that stores intercept information about intercepted contents intercepted by a user of the mobile device; and
    a control unit that transmits the stored intercept information to a content-relay device connected to a content-providing device such that content corresponding to the intercept information is prevented from being transmitted by an originator of said content corresponding to the intercept information based on the intercept information.

7. The mobile device of claim 6, wherein the contents and the selection information are in a Markup language.

8. The mobile device of claim 6, further comprising a Graphic User Interface (GUI) provider that provide a predetermined graphic user interface including the contents to the user.

9. The mobile device of claim 6, wherein the control unit adds the stored intercept information into a header of a predetermined protocol and sends the protocol to the content-relay device.

10. The mobile device of claim 6, wherein the content-relay device filters the contents provided by the content-providing device based on the transmitted intercept information and then transmits the filtered contents.

11. An apparatus for transmitting contents for a mobile device, the apparatus comprising:
    a receiver that receives intercept information about intercepted contents intercepted by an end user from the mobile device;
    an intercept information storage unit that stores the received intercept information; and
    a control unit that transmits the intercept information to a content-providing device such that content corresponding to the intercept information is prevented from being transmitted by an originator of said content corresponding to the intercept information based on the intercept information.

12. The apparatus of claim 11, further comprising a protocol converter that converts a protocol transmitted between the mobile device and the content-providing device.

13. The apparatus of claim 11, wherein the control unit transmits provided contents from the content-providing device to the mobile device.

14. The apparatus of claim 11, wherein the contents and the intercept information are in a Markup language.

15. A method of transmitting contents for a mobile device, the method comprising:
    analyzing predetermined contents and extracting selection information by which a user of the mobile device can determine whether to intercept the predetermined contents;
    storing intercept information about intercepted contents intercepted by the user of the mobile device based on the extracted selection information; and
    transmitting the stored intercept information to a content-providing device such that content corresponding to the intercept information is prevented from being transmitted by an originator of said content corresponding to the intercept information as a result of the transmitting of the stored intercept information.

16. The method of claim 15, wherein the contents and the selection information are in a Markup language.

17. The method of claim 15, further comprising providing a predetermined Graphic User Interface (GUI) including the contents and the extracted selection information to the user.

18. The method of claim 15, wherein, in transmitting the stored intercept information, the stored intercept information is added into a header of a predetermined protocol and the protocol is then sent to the content-providing device.

19. The method of claim 15, wherein the content-providing device filters the contents based on the intercept information and then transmits the filtered contents.

20. A method of transmitting contents for a mobile device, the method comprising:
    storing intercept information about intercepted contents intercepted by a user of the mobile device; and
    transmitting the stored intercept information to a content-relay device connected to a content-providing device such that content corresponding to the intercept information is prevented from being transmitted by an originator of said content corresponding to the intercept information as a result of the transmitting of the stored intercept information.

21. The method of claim 20, wherein the contents and the selection information are in a Markup language.

22. The method of claim 20, further comprising providing a predetermined Graphic User Interface (GUI) including the contents to the user.

23. The method of claim 20, wherein, in transmitting the stored intercept information, the stored intercept information is added into a header of a predetermined protocol and the protocol is then sent to the content-relay device.

24. A method of transmitting contents for a mobile device, the method comprising:
    receiving intercept information about intercepted contents intercepted by an end user from the mobile device;
    storing the received intercept information; and
    transmitting the intercept information to a content-providing device such that content corresponding to the intercept information is prevented from being transmitted by an originator of said content corresponding to the intercept information as a result of the transmitting of the intercept information.

25. The method of claim 24, further comprising converting a protocol transmitted between the mobile device and the content-providing device.

26. The method of claim 24, wherein contents from the content-providing device are transmitted to the mobile device.

27. The method of claim 24, wherein the contents and the intercept information are in a Markup language.

* * * * *